US006396602B1

(12) United States Patent
Kaiser et al.

(10) Patent No.: US 6,396,602 B1
(45) Date of Patent: *May 28, 2002

(54) OPTICAL SWITCHING UNIT, PARTICULARLY FOR SWITCHING TO STANDBY COMPONENTS IN OPTICAL TRANSMISSION SYSTEMS

(75) Inventors: Manfred Kaiser, Hemmingen; Frank Hehl, Murr; Rainer Hausser, Fellbach; Jürgen Anhorn, Kornwestheim, all of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,734

(22) Filed: Dec. 2, 1997

(30) Foreign Application Priority Data

Dec. 2, 1996  (DE) .......................... 196 49 870

(51) Int. Cl.[7] .................... H04B 10/00; H04B 10/08
(52) U.S. Cl. .................. 359/117; 359/119; 359/110; 370/216; 370/223
(58) Field of Search ................. 359/117, 110, 359/128, 135, 161, 119; 370/216, 217, 222, 223, 224

(56) References Cited

U.S. PATENT DOCUMENTS

| 5,069,521 A | | 12/1991 | Hardwick | |
| 5,319,485 A | * | 6/1994 | Yasui et al. | 359/128 |
| 5,457,556 A | * | 10/1995 | Shiragaki | 359/117 |
| 5,640,512 A | * | 6/1997 | Czerwiec | 395/200.01 |
| 5,986,783 A | * | 11/1999 | Sharma | 359/119 |

FOREIGN PATENT DOCUMENTS

| DE | 4017772 | 12/1991 |
| DE | 4203929 | 8/1993 |
| DE | 4433031 | 10/1995 |
| DE | 4421305 | 12/1995 |
| DE | 4433691 | 3/1996 |
| WO | 9428646 | 12/1994 |

* cited by examiner

Primary Examiner—Leslie Pascal
Assistant Examiner—Agustin Bello
(74) Attorney, Agent, or Firm—Ware, Fressola, Van Der Sluys & Adolphson LLP (57) ABSTRACT

An optical switching unit is disclosed which permits switching from faulty components to standby components in optical transmission systems. A component in this connection may be a transmit laser or an optical fiber, for example. The optical switching unit (OSE) according to the invention contains an n×m optical space switch (ORS) whose ports (P1A...PNA; P1B...PMB) are monitored by photodiodes (M1A, M1B). The photodiodes provide a control unit (SE) with information as to whether and, if so, what signals are arriving at the ports. The control unit (SE) controls the position of the optical switch (ORS) in accordance with program instructions. The switching unit controls itself, i.e., incorporation of a higher-level control center is not necessary. It thus allows very short switching times and has many applications; it is particularly suitable for use in modular optical transmission systems.

8 Claims, 6 Drawing Sheets

OPTICAL SWITCHING UNIT, PARTICULARLY FOR SWITCHING TO STANDBY COMPONENTS IN OPTICAL TRANSMISSION SYSTEMS

TECHNICAL FIELD

This invention relates to an optical switching unit, particularly for switching from faulty/transmission facilities to standby transmission facilities in optical transmission systems. Such a transmission facility may be a transmit laser, a receiver photodiode, or an optical fiber, for example.

BACKGROUND OF THE INVENTION

In optical transmission systems, optical fibers interconnect a transmitter and a receiver. Because of the wide transmission bandwidths of optical fibers, a single such fiber generally suffices to transmit the usual amounts of data. To be able to continue to transmit data if the optical fiber should be damaged, one or more spare fibers are laid parallel to that optical fiber. If any damage to the optical fiber is detected, a control unit will cause the transmitter and receiver to switch to a spare fiber.

To increase the reliability of optical transmission systems, a standby laser and/or a standby photodiode, which are used in case of failure of the main device, are frequently incorporated into the system. Since communication is interrupted while changeover to a standby transmission facility is effected, the dead time of the transmission system, i.e., the time required for the changeover, should be as short as possible.

European Patent Application EP-A1-519 712 discloses an optical bus network in which the two end nodes of the bus are connected by optical fibers to an additional monitoring node ("terminal node"). The monitoring node, which is thus connected directly between the two end nodes, establishes a direct connection between the two end nodes with the aid of a switch if there is a discontinuity in the bus. As a result, the nodes in the immediate vicinity of the discontinuity become the new end nodes of the bus. To be able to detect discontinuities (e.g., a break in a fiber), the monitoring node includes optical-to-electrical transducers with which it monitors the signals from the end nodes.

Figure 6:
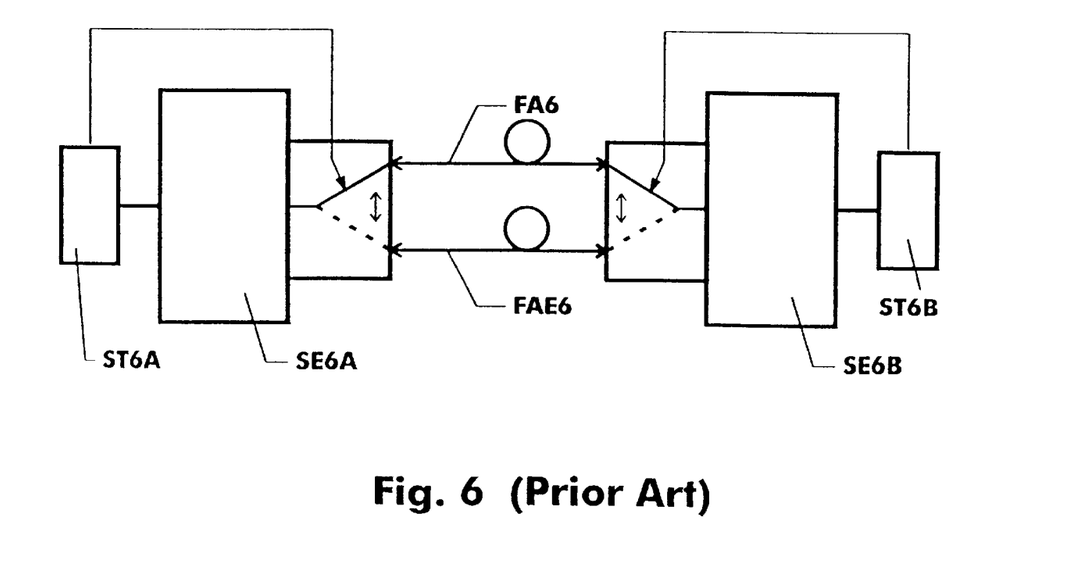
FIG. 6 is a schematic block diagram of a prior art circuit for switching to a spare fiber in an optical transmission system.

Offenlegungsschrift DE-A1-44 33 031 discloses a method of switching to one or more spare lines in unidirectional or bidirectional optical transmission systems (see FIG. 6). If the receiver portion of a transceiver unit SE6A at one end of a bidirectional optical transmission system does not receive the data stream transmitted over an optical fiber FA6 or receives the data stream only in greatly disturbed form, it will communicate this to a control unit ST6A associated with this end. The control unit causes the transmitter and receiver at this end to be switched to a spare line FAE6. The receiver portion of a transceiver unit SE6B at the other end of the transmission link then determines that no signal is now present on the originally used optical fiber FA6. In response to this, the control unit ST6B initiates a changeover to the spare line FAE6 at that end of the transmission link as well.

Under certain circumstances, for example in the case of very long transmission links, the probability that not only the optical fiber actually intended for transmission but also the spare fiber will be damaged is relatively high. In that case, the data transmission will collapse. To prevent this, more than one spare fiber may be laid, as is known from-the above-cited DE-A1-44 33 031. Particularly in the case of long transmission links, however, the additional optical fibers to be laid represent a considerable cost factor.

SUMMARY OF THE INVENTION

It is therefore an object of the invention to provide an optical switching unit with which changeover can be effected from faulty transmission facilities to standby transmission facilities in optical transmission systems. The optical switching unit is to be simple in construction and universally applicable. In particular, the optical switching unit is to permit the construction of an optical transmission system which allows reliable data transmission even in the event of frequent damage to optical fibers but requires as few spare optical fiber as possible.

The invention attains the object with an optical switching unit for use in optical transmission systems, comprising an n×m optical space switch having n+m ports, with n=1, 2, 3, 4, . . . and m=2, 3, 4, . . . , wherein means are provided for monitoring the optical signals arriving at at least one port on each side of the optical space switch and for controlling the position of the n×m space switch in accordance with changes in the optical signals being monitored. One, a number, or all of the ports on both sides of an n×m optical space switch are monitored by photodiodes which are connected to a control unit incorporated into the optical switching unit. The control unit controls the position of the optical space switch in accordance with changes in the signals applied at the ports. Depending on how the control unit is programmed, the optical switching unit according to the invention can be used to advantage for different functions.

In a first embodiment, the optical switching unit is used as a switch in an optical transmission link. The optical link consists of a first optical fiber and a parallel, second optical fiber as a spare fiber. Optical switching units according to the invention are integrated into the link at given intervals. If the first optical fiber is broken, the optical switching units adjacent to the break will detect this and switch to the existing spare fiber. Since the switching processes are initiated and controlled in the transmission link itself and not centrally at the transmitter end, the dead time of the transmission system, i.e., the time in which no data transmission takes place, is very short.

The division of the transmission link into several sections ensures reliable data transmission even if both optical fibers have one or even more breaks since, according to the invention, only the respective faulty section is bypassed by the spare fiber. Another advantage is that the positions of the optical switches can also be controlled from the transmitter directly via the optical fibers if the optical switching unit is programmed in such a way as to detect particular patterns in the data stream and initiate corresponding switching processes in response thereto.

In a second embodiment, the optical switching unit is used in an arrangement of transmit lasers to switch to a standby laser if one of the transmit lasers fails. In that case, too, the transmission capability of the system can be restored in the shortest time.

In a third embodiment, the optical switching unit is used as an optical selector switch. In packet-switched transmission systems, the optical switching unit is capable of detecting the address field in the packet header and of establishing connections in accordance with this information. Thus, the switching unit according to the invention can be used to advantage in future optical ATM exchanges, for example.

BRIEF DESCRIPTION OF THE DRAWINGS

The invention will become more apparent from the following description of embodiments when taken in conjunction with the accompanying drawings, in which.

BEST MODE FOR CARRYING OUT THE INVENTION

Figure 1:
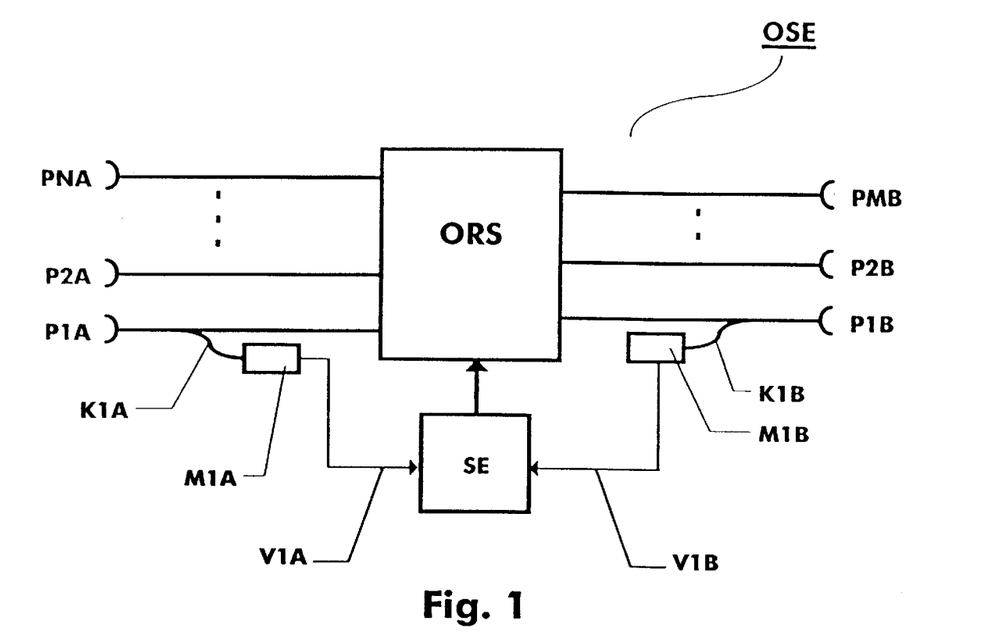
FIG. 1 is a schematic block diagram of an optical switching unit.

FIG. 1 shows an optical switching unit according to the invention. The switching unit OSE contains an optical space switch ORS which has n ports P1A . . . PNA on the left-hand side and m ports P1B . . . PMB on the right-hand side. At each port, light can enter or leave or both enter and leave the optical space switch ORS depending on whether unidirectional or bidirectional transmission is taking place. The optical space switch enables each of the left-hand ports P1A . . . PNA to be connected to every right-hand port P1B . . . PMB. In most applications, n will be chosen equal to m, i.e., the space switch will have equal numbers of ports on both sides. Applications are also conceivable, however, in which n is not equal to m. This variant is dealt with in an embodiment explained below.

In FIG. 1, the port P1A on the left-hand side of the space switch ORS is monitored by a monitoring unit M1A. On the right-hand side of the space switch ORS, a monitoring unit M1B monitors the port P1B. The monitoring units are preferably photodiodes, but it is also possible to use other components, such as photomultipliers. "To monitor the ports" as used herein means that the monitoring units M1A and M1B at least determine whether light is entering the optical space switch ORS at the respective port or not. In a broader sense, "to monitor" may also mean that the monitoring units M1A and M1B are capable of checking signals applied at the respective port for their information content. In that case, these monitoring units also include demultiplexing and/or decoding devices, for example, depending on the transmission technique used.

The information thus obtained is transferred from the monitoring units M1A and M1B over links V1A and V1B to a control unit SE. Based on this information, the control unit then controls-the-position of the optical space switch ORS via the optical signals at the ports. The control unit preferably comprises a microprocessor and a memory unit. The relationship between the switch position and the signals applied at the ports being monitored is determined by programming or by hardwired logic and depends on the application of the optical switching unit.

Figure 2:
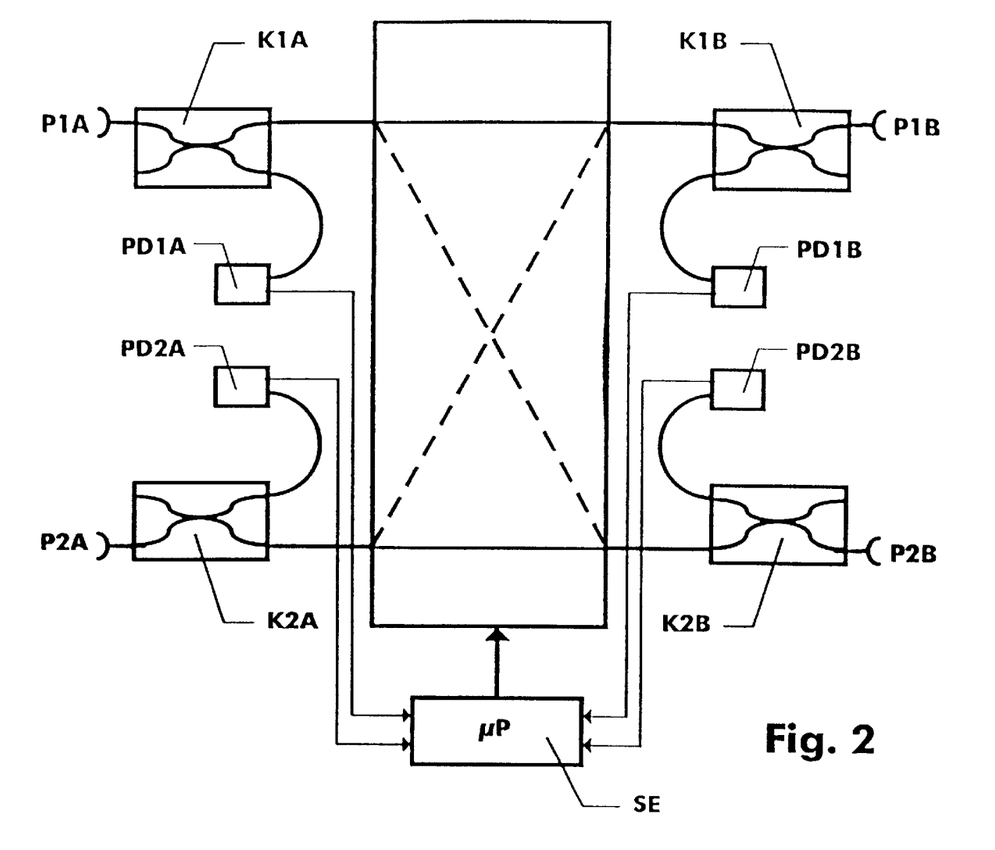
FIG. 2 is a schematic block diagram of an optical switching unit wherein the monitoring means comprise photodiodes, directional couplers and a control unit.

FIG. 2 shows a specific embodiment of the optical switching unit according to the invention. Here the optical space switch ORS is a 2×2 space switch as is currently obtainable as an integrated optical component. The space switch ORS is connected to optical waveguides, e.g., optical fibers or integrated optical waveguides. The ports of the optical space switch ORS are designated P1A, P2A and P1B, P2B. Connected ahead of the port P1A is an optical directional coupler K1A. The directional coupler K1A, for example a fused fiber coupler, taps off a portion of the optical signal applied at the port P1A and feeds it to the photodiode PD1A. The photodiode is connected to the control unit SE. In analogous fashion, the other three ports are monitored by photodiodes PD2A, PD1B, PD2B. The control unit comprises a microprocessor and controls the position of the optical space switch.

Figure 3:
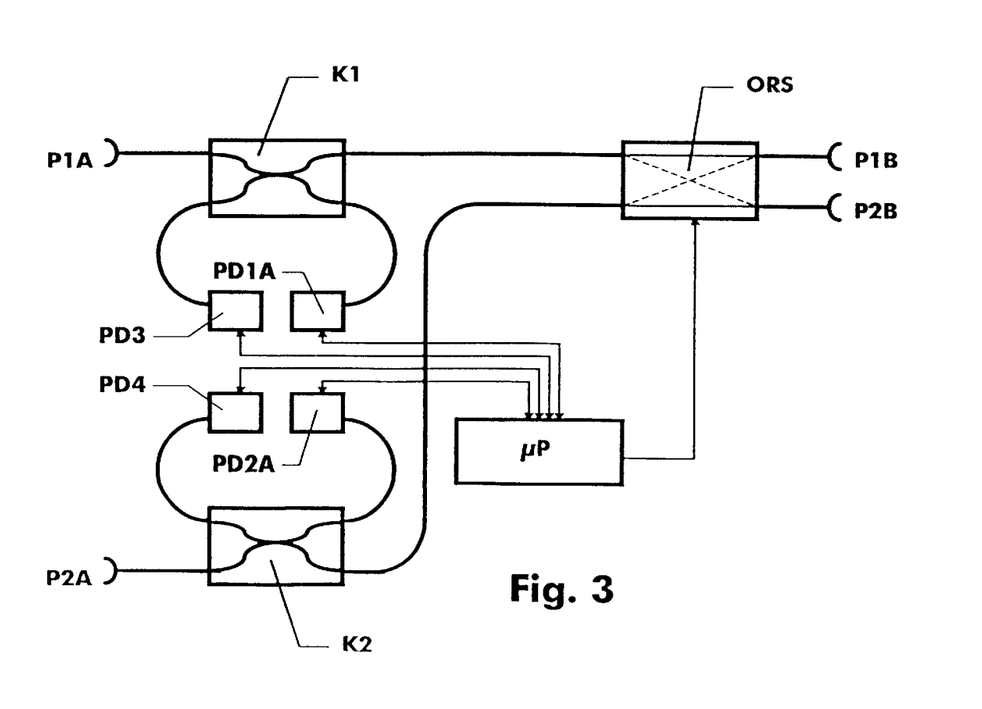
FIG. 3 is a schematic block diagram of an optical switching unit wherein the monitoring means monitor all signals entering through the ports on one side of the optical space switch and all signals exiting through said ports according to a third embodiment.

FIG. 3 shows a particularly advantageous embodiment. Unlike the embodiment illustrated in FIG. 2, this embodiment requires only two directional couplers K1 and K2 to tap off light from all four ports P1A, P2A, P1B, P2B. As in the above embodiment, the port P1A is monitored by the photodiode PD1A. The port P1B on the other side of the optical space switch ORS, however, is monitored by the photodiode PD3 or PD4, depending on the position of the optical space switch ORS. If the optical space switch ORS is set at through-connection (continuous line in FIG. 3), the signal applied at port P1B will pass through the optical space switch and the directional coupler K1 to the photodiode PD3. If the optical space switch ORS is set at cross connection (dashed line), the signal applied at port P1B will pass through the optical space switch and the directional coupler K2 to the photodiode PD4. Since the control unit SE knows the position of the optical space switch ORS, it can unambiguously assign the information provided by the four photodiodes PD1A, PD2A, PD3, PD4 to the individual ports. Since this embodiment requires only two directional couplers, the optical switching unit can be of a very compact design.

If the optical space switch ORS is an n×m space switch with n≠m, the directional couplers must be located on that side of the optical space switch which has the greater number of ports. In a 4×8 space switch, for example, this eliminates the need for four directional couplers.

Figure 4A:
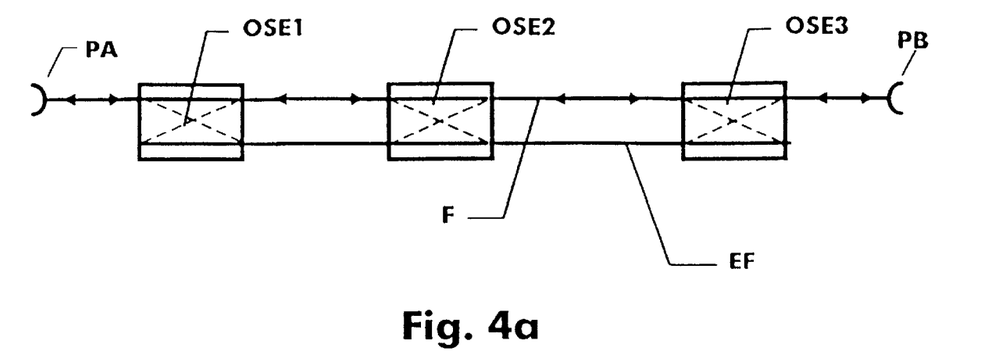
FIG. 4a is a schematic block diagram of a circuit for switching to a spare fiber in a bidirectional optical transmission system, optical fiber unbroken.
Figure 4B:
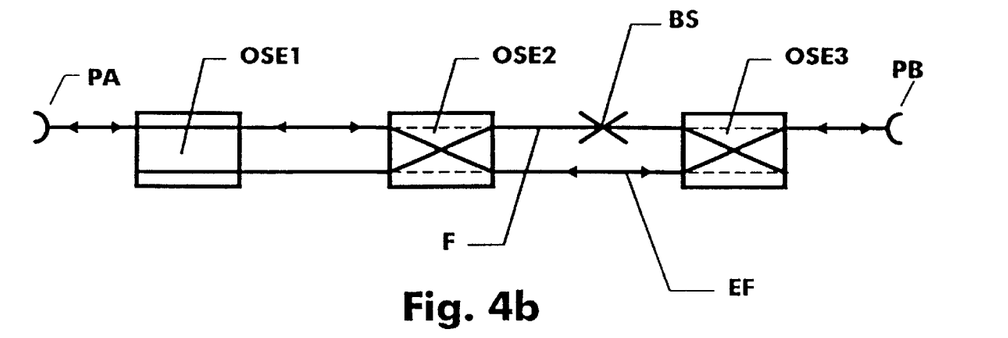
FIG. 4b is a schematic block diagram of a circuit for switching to a spare fiber in a bidirectional optical transmission system, optical fiber broken.

In the embodiment shown in FIGS. 4a and 4b, the optical switching unit according to the invention is used to switch from an optical fiber F to a spare fiber EF in a bidirectional optical transmission system. In FIG. 4a, the path between the communication end points PA and PB is divided into four sections by three optical switching units OSE1, OSE2, and OSE3 according to the invention. The optical switching units are set at through-connection and thus connect the communication end point PA to the communication end point PB via the optical fiber F.

If, as sketched in FIG. 4b, an interruption in transmission occurs between the two optical switching units OSE2 and OSE3, for example because the fiber has broken or has been bent at too small a radius, the optical switching units OSE2 and OSE3 adjacent to the break BS will detect the absence of input signals on the respective sides facing the break BS. They respond to this immediately by switching to the spare fiber EF. Thus, changeover to the spare fiber is effected only in the faulty section of the transmission path. If the spare fiber EF should be damaged in the section between the optical switching units OSE1 and OSE2, this division of the transmission path according to the invention still permits undisturbed data transmission.

The principal advantage of this solution over prior art solutions is that the switching actions are initiated at decentralized locations, i.e., by the switching units themselves and not by a central control station associated with the end points of the transmission path. As a result, very short dead times are possible; in addition, the transmission path can be modular in construction and be supplemented without the need to make any changes at the communication end points.

Figure 5:
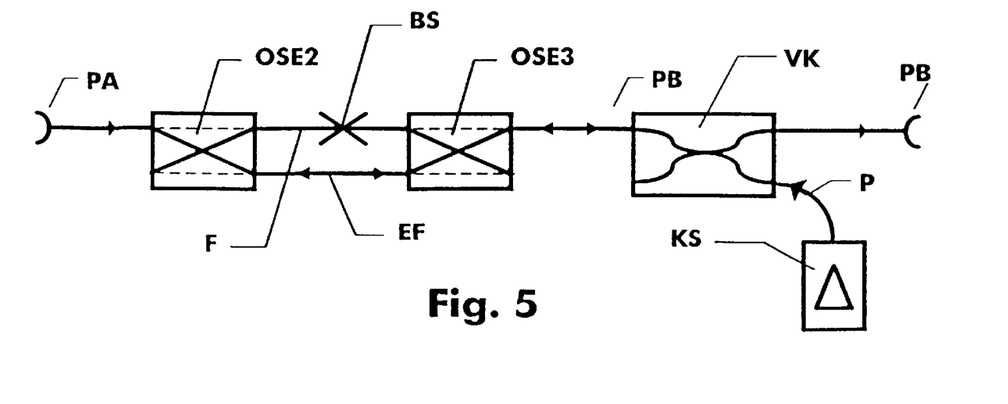
FIG. 5 is a schematic block diagram of a circuit for switching to a spare fiber in a unidirectional optical transmission system, optical fiber broken.

In the embodiment illustrated in FIG. 5, the principle shown in FIG. 4 for bidirectional transmission is adapted to unidirectional transmission. The unidirectional transmission takes place from the communication end point PA to the communication end point PB. If a break BS occurs in the section between the optical switching units OSE2 and OSE3, the optical switching unit OSE3 will detect no signal at the associated port and then switch to the spare fiber EF. To also enable the optical switching unit OSE2, located to the left of the break in FIG. 5, to detect the disconinuity in the optical fiber F, an optical check signal generated by a check-signal transmitter KS is coupled into the optical fiber F from the receiver end PB. The check-signal transmitter may be a semiconductor laser, for example; coupling to the optical fiber F is preferably effected via a fused fiber coupler VK.

This signal, which is injected in the direction of arrow P, passes through the optical fiber F in a direction opposite to the direction of transmission. Since after occurrence of the break the optical switching unit OSE3 has already switched (see continuous lines in OSE3), the check signal passes along the spare fiber EF and thus reaches the associated port of the optical switching unit OSE2. Without a break in the optical fiber F, the check signal would have been routed to the adjacent port, i.e., the upper port in FIG. 5. Since, in the event of a break in the optical fiber F, the check signal is automatically routed to the other port of the optical switching unit OSE2, this optical switching unit OSE2 detects the break immediately and switches to the spare fiber EF without-delay, so that the signal to be transmitted now passes along the spare fiber EF.

Figure 7A:
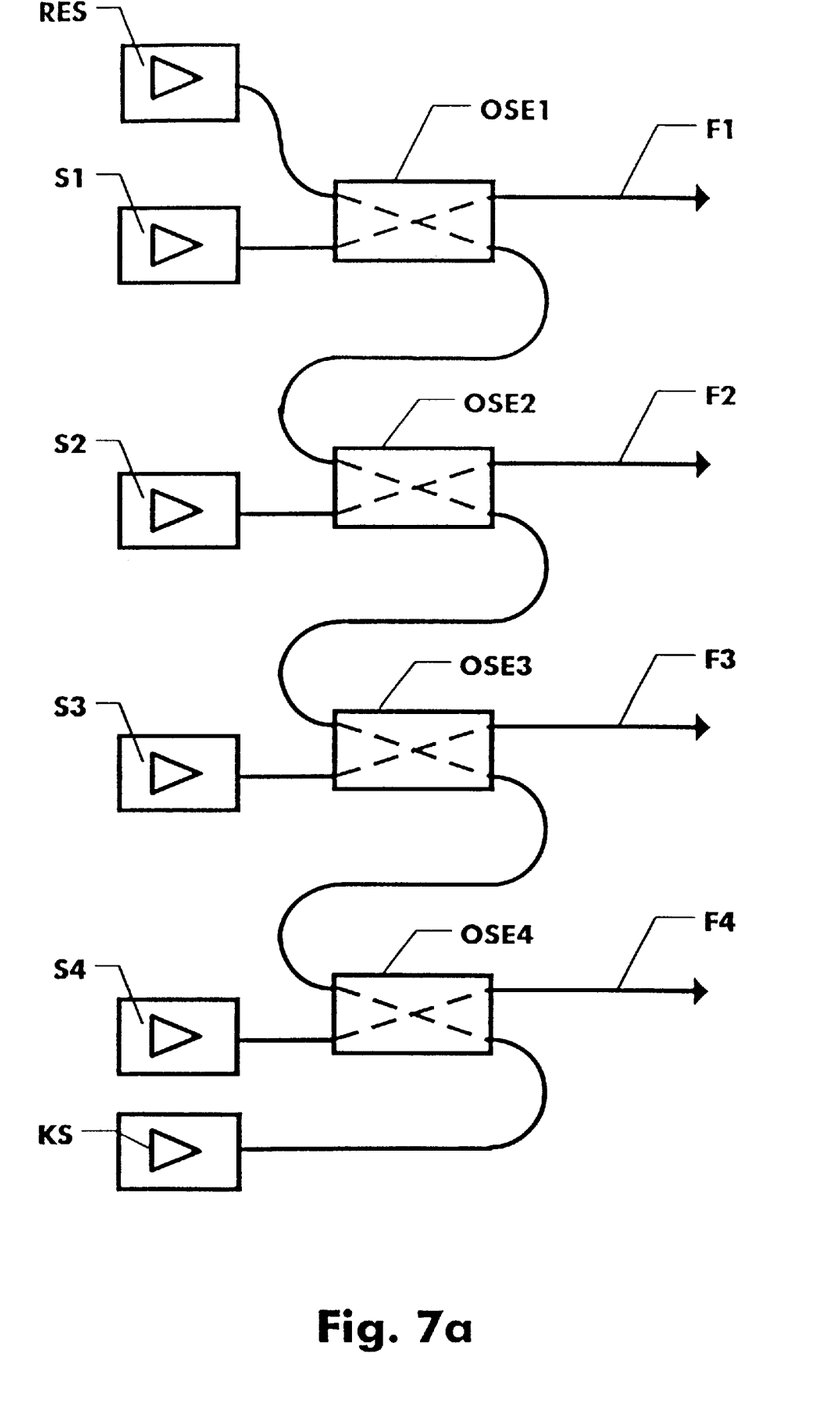
FIG. 7a is a schematic block diagram of a circuit for switching to a standby transmitter in an optical transmission system in which all transmitters are operating correctly.
Figure 7B:
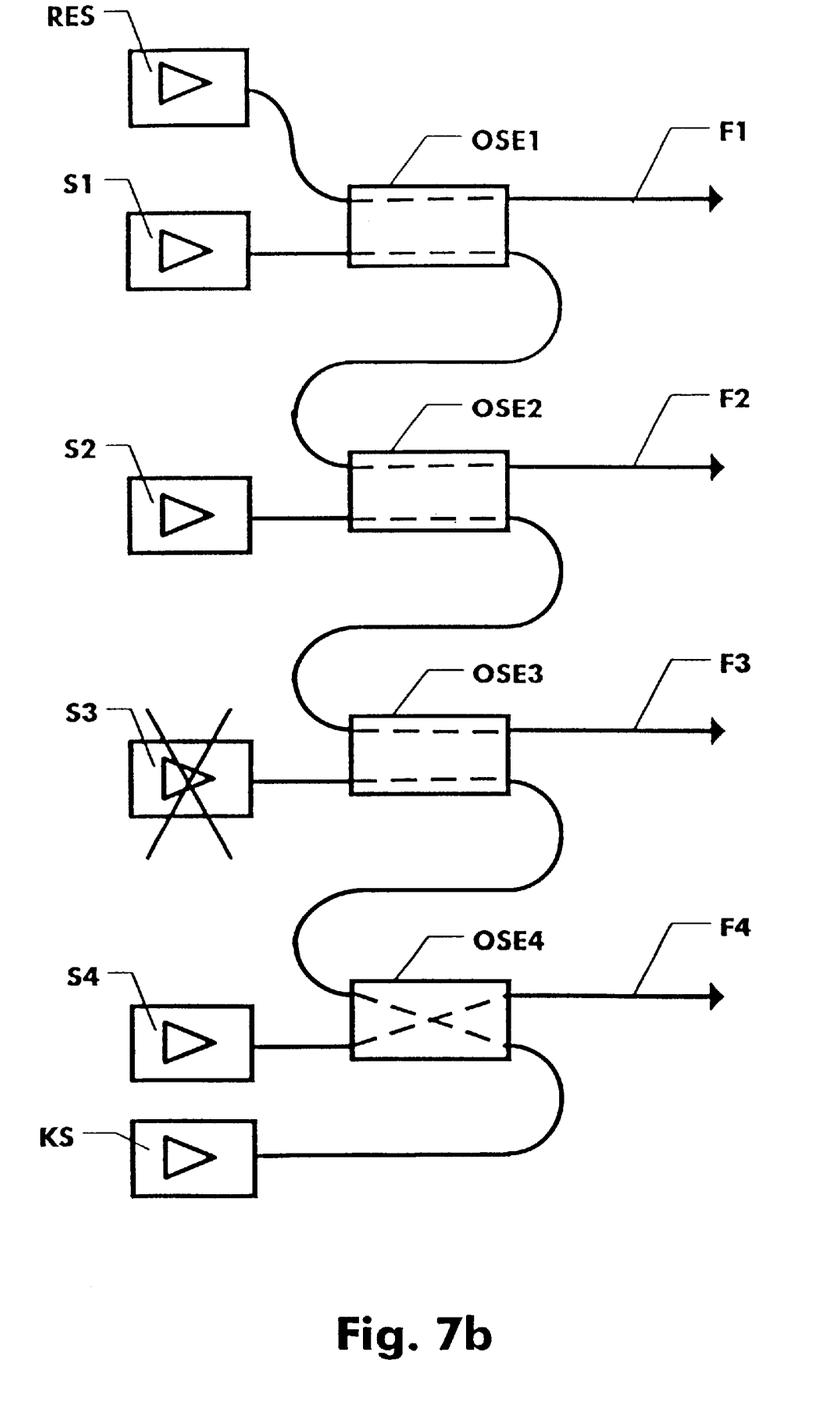
FIG. 7b is a schematic block diagram of a circuit for switching to a standby transmitter in an optical transmission system in which one transmitter is faulty.

Another embodiment of the present invention is shown in FIGS. 7a and 7b. In this embodiment, the optical switching unit according to the invention is used in a standby arrangement for optical transmitters. In the undisturbed condition, each of four transmitters S1 . . . S4 is connected to a respective one of four optical fibers F1 . . . F4 via respective optical switching units OSE1 . . . OSE4. The states of the optical switching units are indicated in FIG. 7a by dashed lines. In this normal state, a check-signal transmitter KS is connected to a standby transmitting unit RES. The standby transmitting unit comprises an optical transmitter which is preferably implemented in the same manner as the four transmitters S1 . . . S4. In addition, the standby transmitting unit incorporates a photodiode which monitors the presence of a signal. When none of the four transmitters S1 . . . S4 is faulty, this photodiode detects the check signal emitted by the check-signal transmitter KS. As long as this signal is detected, the optical transmitter in the standby transmitting unit RES remains in the standby mode, i.e., it does not emit light.

If, for example, the transmitter S3 fails, as shown in

FIG. 7b, the optical switching unit OSE3 will detect the absence of a signal at the associated port. The optical switching unit will then change its state. The check-signal transmitter KS is now connected to the failed transmitter S3 rather than the standby transmitting unit RES. The two optical switching units OSE2 and OSE1 then detect the absence of the signal emitted by the check-signal transmitter KS and change their states as well. Since the standby transmitting unit RES is no longer receiving a check signal, it will change from the standby mode to the active mode and emit light. Thus, the end state shown in FIG. 7b has been reached. The standby transmitting unit RES and the transmitters S1, S2, and S4 are now connected to the optical fibers F1 . . . F4. After the failure of the transmitter S3, the connection is thus maintained virtually unchanged.

Depending on whether all four optical fibers are fed with identical or different signals, electronics of suitable design must ensure that upon changeover to the standby transmitting unit RES, the modulation currents supplied to the optical transmitters S1 . . . S4 are diverted appropriately. Furthermore, it may be advantageous to select for the signal emitted by the check-signal transmitter KS a separate wavelength which is different from the transmission wavelength. In this manner, light which does not originate from the check-signal transmitter KS is effectively prevented from being coupled into the standby transmitting unit RES by crosstalk in the optical switching units.

Here, too, the essential advantage of the use of the optical switching unit according to the invention is that switching of the space switches is effected without the need for a central control unit and, therefore, without delay.

In a further embodiment, the-optical switching unit is used as an optical selector switch. Such optical selector switches are needed for all-optical switching in optical transmission systems. In an optical exchange, like in electronic exchanges, switching networks are to be used for concentrating, distributing, and expanding transmission lines. In packet-switched optical transmission systems, the packet headers include data fields for the address. This address must be recognized by the switching network so that the call can be guided to the correct destination.

Figure 8A:
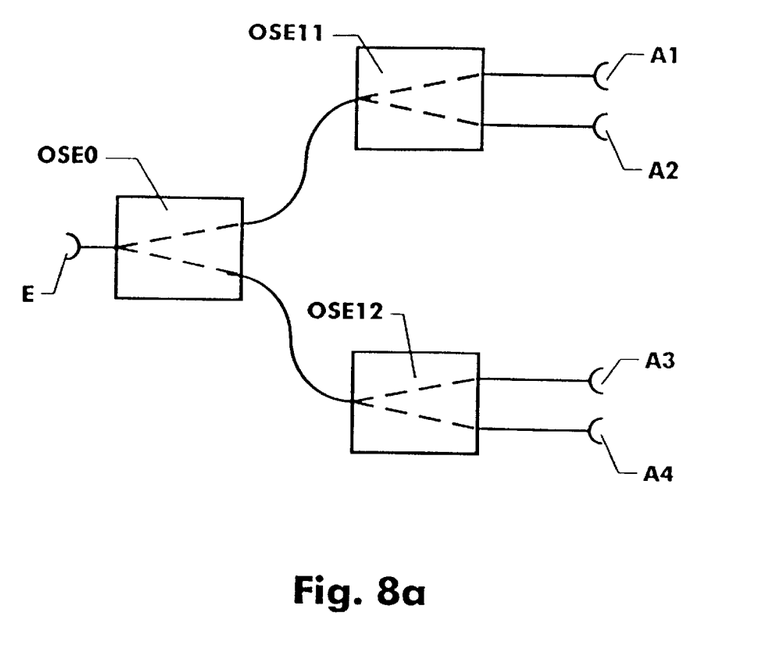
FIG. 8a shows an example of the use of the optical switching unit according to the invention as an optical selector switch in an expansion unit of an optical switching network.

FIG. 8a shows a simple example of an expansion unit in an optical switching network. By the use of three optical switching units according to the invention, OSE0, OSE11, and OSE12, the input E can reach any of the four outputs A1 . . . A4. At the port of the optical switching unit OSE0, the data packets are monitored by a photodiode. The control unit incorporated in the optical switching unit according to the invention recognizes the address in the data packet and, depending on how the switching unit is programmed, causes the signals to be directed to one of the two outputs of the optical switching unit. The two optical switching units OSE11 and OSE12 in the second switching-network plane operate correspondingly. Thus, in this embodiment, optical space switches as are commonly used in switching networks are not controlled by a central control unit connected to all space switches, but they control themselves, so to speak. As a result, a modular construction of such switching networks becomes much simpler and less costly. It should be noted that in this embodiment, the numbers of ports on the two sides-of the optical space switch are not equal (n≠m).

Figure 8B:
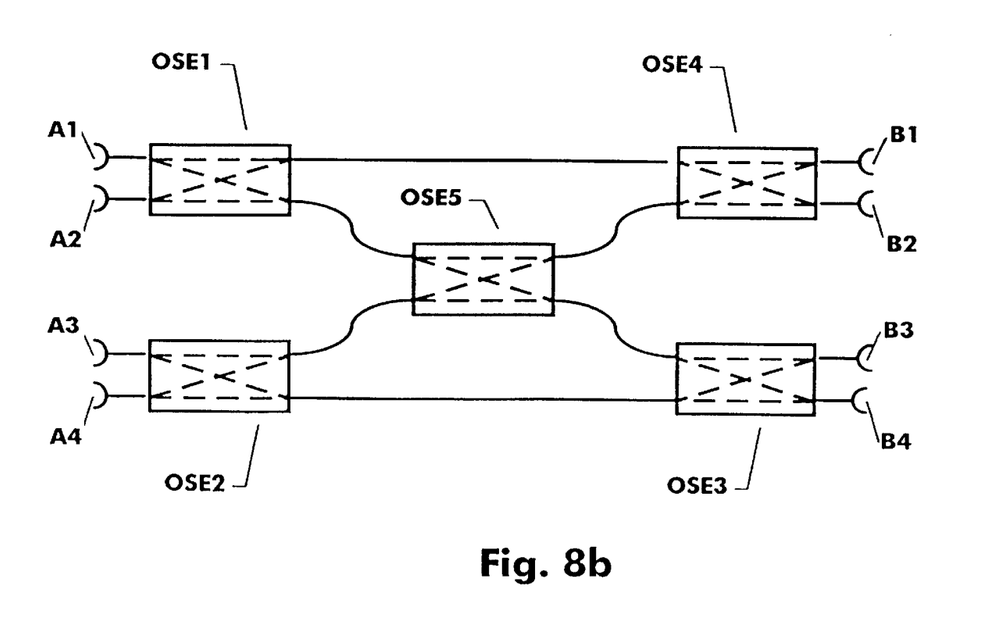
FIG. 8b shows an example of the use of the optical switching unit according to the invention as an optical selector switch in a distribution unit of an optical switching network.

FIG. 8b shows a distribution unit in a switching network. Each of the four ports A1 . . . A4 on the lefthand side of the distribution unit is connectable via the five optical switching units OSE1... OSE5 to any one of the four ports B1 . . . B4 on the right-hand side. Each optical switching unit incorporates a 2×2 optical space switch whose four ports are monitored by one photodiode each. This makes it possible to process call requests arriving from both sides of the distribution unit.

While only a few simple examples of the possible applications of the optical switching unit according to the invention have been described, it is readily apparent from these examples that the optical switching unit according to the invention has many applications in optical transmission and switching systems.

What is claimed is:

1. An optical switching unit for use in optical transmission systems, comprising an n×m optical space switch (ORS) having n+m ports (P1A . . . PNA; P1B . . . PMB), with n=1, 2, 3, 4, . . . and m=2, 3, 4, . . . with at least one of the n+m ports for connecting a bidirectional communication line, characterized in that one of the n+m ports different than the port for connecting the bidirectional communication line is set aside for connecting a spare communication line, and further in that monitoring and control means (K1A, K1B, M1A, M1B, SE) are provided for monitoring whether or not light is entering the optical space switch (ORS) via the bidirectional communication line connected to one of the n+m ports (P1A, P1B), and, in response to determining a disruption in light entering the optical space switch (ORS) via the bidirectional communication line connected to one of the n+m ports, for autonomously controlling the position of the n×m space switch (ORS) so as to switch to the spare communication line, the autonomous controlling being performed without cooperation with any other optical space switch or associated monitoring and control means.

2. An optical switching unit as claimed in claim 1 wherein the means monitor all signals enntering through the ports (P1A, P2A in FIG. 3) on one side of the optical space switch (ORS) and all signals existing through said ports.

3. An optical switching unit as claimed in claim 2 wherein the means comprise photodiodes (PD1A, PD2A, PD1B, PD2B in FIG. 2), directional couplers (K1A, K1B, K2A, K2B) and a control unit (SE).

4. An optical switching unit as claimed in claim 1 wherein the means comprise photodiodes (PD1A, PD2A, PD1B, PD2B in FIG. 2), directional couplers (K1A, K1B, K2A, K2B) and a control unit (SE).

5. A bidirectional optical transmission system comprising:
   a) a first transceiver unit;
   b) a second transceiver unit;
   c) a first optical waveguide (F in FIGS. 4a and 4b) connecting the first transceiver unit with the second transceiver unit;
   d) at least k further optical waveguides (EF) arranged parallel to the first optical waveguide (F), with k=1, 2, 3, . . . , so as to provide in combination with the first optical waveguide a total of k+1 optical waveguides; and
   e) at least two optical switching units (OSE1, OSE2, OSE3), each optical switching unit for use in optical transmission systems, comprising an n×m optical space switch (ORS) having n+m ports (P1A . . . PNA; P1B . . . PMB), with n=1, 2, 3, 4, . . . and m=2, 3, 4, . . . with at least one of the n+m ports for connecting a bidirectional communication line, wherein means (K1A, K1B, M1A, M1B, SE) are provided for monitoring whether or not light is entering the optical space switch (ORS) via the bidirectional communication line connected to one of the n+m ports (P1A, P1B), and for autonomously controlling the position of the n×m space switch (ORS) in accordance with whether or not light is entering the optical space switch (ORS) via the bidirectional communication line connected to one of the n+m ports (P1A, P1B), wherein the at least two optical switching units are
   coupled to the optical waveguides (F, EF), and
   further wherein, if any one of the total of the k+1 optical waveguides (F, EF) is damaged in at least one of the sections located between two optical switching units, the optical switching units switch autonomously to another optical waveguide in said section, the autonomous switching being performed without cooperation with any other optical space switch.

6. A bidirectional optical transmission system as claimed in claim 5, wherein the means of each optical switching unit monitor all signals entering through the ports (P1A, P2A in FIG. 3) on one side of the optical space switch (ORS) and all signals exiting through said ports.

7. An optical switching network comprising a plurality of selector switches, characterized in that the selector switches are optical switching units, wherein each optical switching unit is for use in optical transmission systems, comprising an n x m optical space switch (ORS) having n+m ports (P1A . . . PNA; P1B . . . PMB), with n=1, 2, 3, 4, . . . and m=2, 3, 4, . . . with at least one of the n+m ports for connecting a bidirectional communication line, wherein one of the n+m ports different than the port for connecting the bidirectional communication line is set aside for connecting a spare communication line, and further wherein monitoring and control means (K1A, K1B, M1A, M1B, SE) are provided for monitoring whether or not light is entering the optical space switch (ORS) via the bidirectional communication line connected to one of the n+m ports (P1A, P1B) of the optical space switch (ORS), and, in response to determining a disruption in light entering the optical space switch (ORS) via the bidirectional communication line connected to one of the n+m ports, for autonomously controlling the position of the n×m space switch (ORS) so as to switch to the spare communication line, the autonomous controlling being performed without cooperation with any other optical space switch or associated monitoring and control means.

8. An optical switching network as claimed in claim 7, wherein the means of each optical switching unit monitor all signals entering through the ports (P1A, P2A in FIG. 3) on one side of the optical space switch (ORS) and all signals exiting through said ports.

* * * * *